(No Model.)
2 Sheets—Sheet 1.
J. C. HENRY.
ELECTRIC MOTOR AND DYNAMO.
No. 426,380. Patented Apr. 22, 1890.
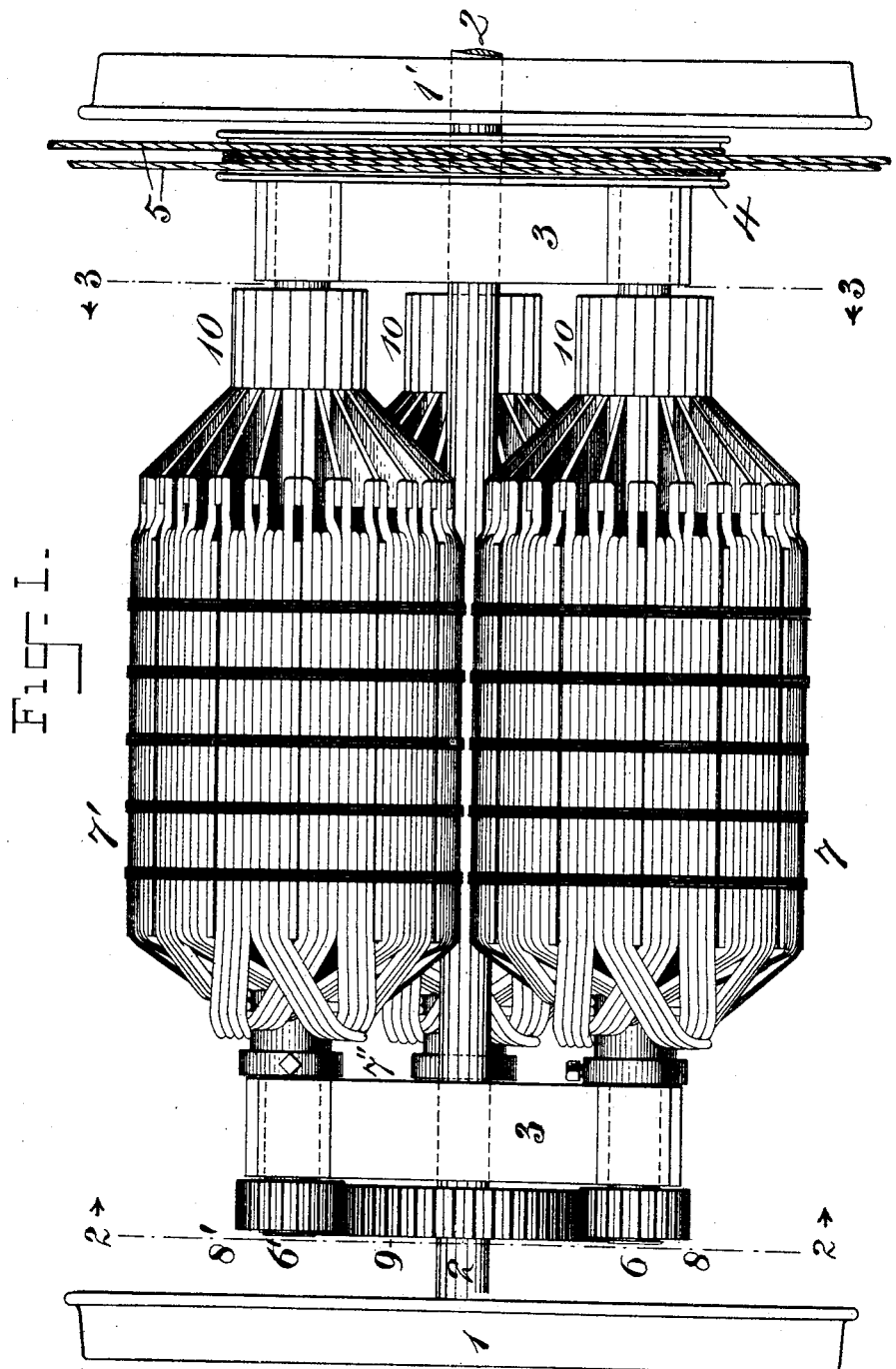
Witnesses.
John F. Nelson
George S. Bell
Inventor
John C. Henry
By ——
Attys.

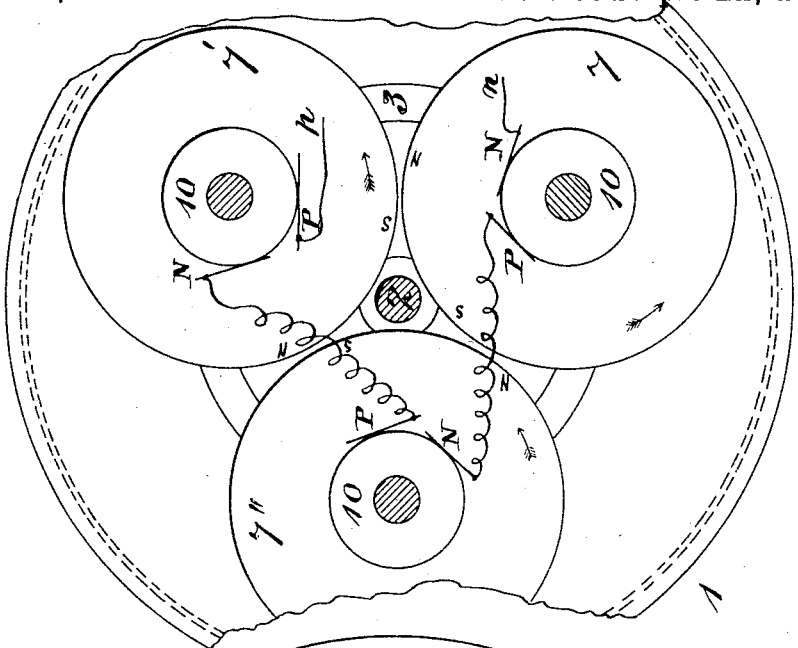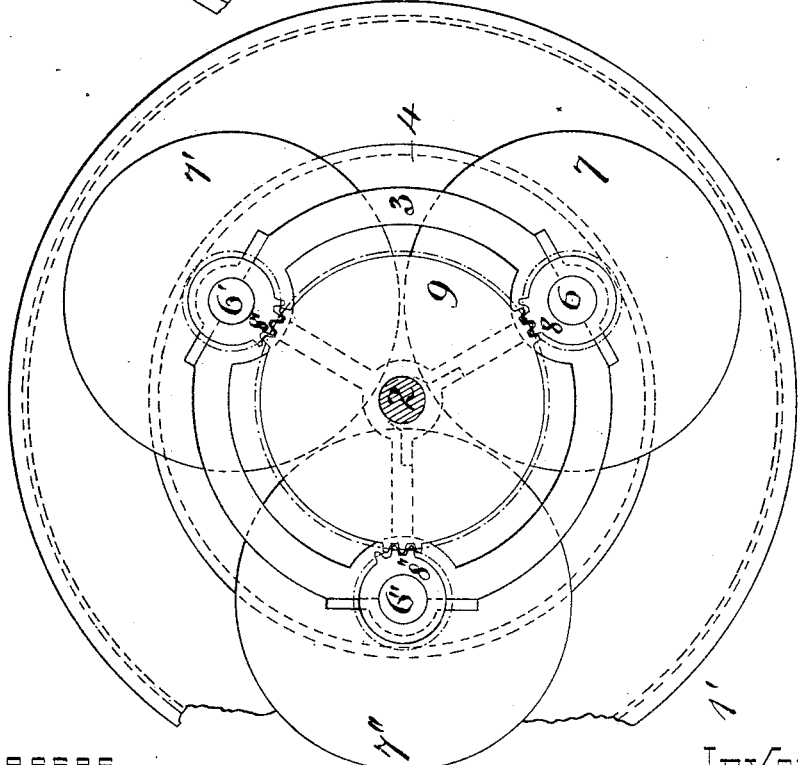

UNITED STATES PATENT OFFICE.

JOHN C. HENRY, OF NEW YORK, N. Y.

ELECTRIC MOTOR AND DYNAMO.

SPECIFICATION forming part of Letters Patent No. 426,380, dated April 22, 1890.

Application filed September 5, 1889. Serial No. 323,016. (No model.)

*To all whom it may concern:*

Be it known that I, JOHN C. HENRY, of New York, in the county and State of New York, have invented a new and useful Improvement in Electric Motors and Dynamos, of which the following is a specification.

The object of this invention is to provide a motor (or a dynamo) of compact and light construction adapted to be connected to slow-speed driven (or driving) mechanism and mounted directly thereon.

The invention will be described for a motor.

With the above objects in view I dispense with the customary field-magnet and I employ a plurality of armatures, of which each armature discharges the functions of a field-magnet to the other or others, and is in like manner subject to the field influences of the other armature or armatures. Thus I may employ, say, three armatures journaled in a suitable frame symmetrically about a common axis, which may be a car-axle, for example, each armature carrying a pinion which meshes with and drives a gear-wheel of large diameter upon such axle. Each armature has a pair of "brushes," by which the current respectively enters and leaves the armature, and these brushes are so located relatively to each other and to the system as to produce the alternating attractive and repellant electro-magnetic actions necessary to secure the armature rotation, all the armatures coacting to rotate the axle as aforesaid.

Associated with the above may be a brake mechanism preferably of the peculiar construction hereinafter explained. The arrangement of this brake is entirely unlike that employed in vehicles, and operates (when drawn taut) to cause secular rotations of the armatures to revolve the axle and when slackened to permit the armatures to revolve planet-wise about the axle either without rotating it or rotating it but slowly, at discretion of the operator.

Reference being had to the accompanying drawings, making part of this specification, Figure I is a side view of a triplex electric motor embodying my invention. Fig. II is a section on the line II II. Fig. III is a section on the line III III.

1 1' may represent two ordinary track-wheels of a railway-car; 2, the axle thereof.

Mounted and capable of revolving upon the axle 2 is a frame 3, which may be of circular, triangular, or other suitable form, and which has rigidly attached to it a sheave 4, whose rotation is normally prevented by one or more cables 5 being drawn taut around it. Journaled in said frame 3, symmetrically to each other and to the axle, are the shafts 6 6' 6" of as many armatures 7 7' 7". Each armature-shaft has fastened to it a pinion 8 8' 8", which meshes in a gear-wheel 9 that is fastened to the axle 2. Hence, the frame 3 being held fast by the cables 5, rotation of the armatures all in the same general direction (see arrows in Fig. III) results in rotating the axle 2 and with it the car-wheels 1 1'. The pinions 8 8' 8" are purposely made of much smaller diameter than the gear-wheel 9, so as to greatly slow down the motion from the armatures to the axles.

P N represent the brushes.

10 is the commutator-cylinder.

$p$ $n$ are the rheophores to the outer circuit.

In a representation of the invention as used for a dynamo the car-wheels would of course be omitted, and the member 2, instead of a car-axle driven from the motor, would be a shaft of or driven from a steam-engine or other prime mover, and the rotation of the armatures 7 7' 7" would generate current and force the same into a motor or other working circuit.

I do not restrict myself to any one specific form of armature, because any form or type, either wound for continuous or alternate currents, may be used, which will operate in the manner described.

Instead of a gear-wheel with external cogs, as shown at 9, Figs. I and II, a wheel with internal cogs may be used, which will have the double advantage of protecting all the cog-work and of still further slowing down the speed.

The number of armatures may be less or greater than in the present illustration, and may include one on the central axle surrounded by others mounted in the frame.

Any suitable friction-clutch connection of gear-wheel 9 with axle 2 may be substituted for the described sheave and cable device 4 5.

The described clutch or fast-and-loose attachment of the gear-wheel 9 to the axle 2 is thought to render the device especially available for stopping and starting machines employing alternate currents.

In some applications of my invention the gear-wheel may be keyed fast to the central shaft or axle, the fast-and-loose clutch-connection being then of course dispensed with.

Having thus described my invention, the following is what I claim as new therein and desire to secure by Letters Patent:

1. In a motor or dynamo, the combination of two or more armatures which act reciprocally as fields to each other and are all geared to a single shaft or axle, which is exterior to and symmetrically located between them.

2. In a motor or dynamo, the combination of two or more armatures which act mutually as fields to one another, and of which each has a pinion that meshes in a gear-wheel of relatively large diameter symmetrically located between or around them, as and for the purpose set forth.

3. In a motor or dynamo, the combination of two or more armatures symmetrically journaled in a frame about a shaft or axle, to which they are geared, in the manner and for the purposes set forth.

4. In a motor or dynamo, the combination of a plurality of armatures, of which each discharges the functions of field to the other or others, journaled in a common frame 3, and the said frame 3 journaled about a shaft or axle 2, placed centrally and geared to said armatures, as and for the purposes set forth.

5. In a motor or dynamo employing a plurality of armatures which act and react as fields to one another, and in combination with the same, the friction-clutch or fast-and-loose geared connection of said armatures with the driven or driving shaft or axle, which is exterior to and symmetrically located between said armatures, substantially as and for the purposes set forth.

6. In a motor or dynamo, the combination, with three armatures which act and react as fields to one another and are all journaled at equal angular distances in a frame, which is itself journaled about a shaft or axle symmetrical of and geared to said armatures, and exterior to the same a sheave rigidly attached to said frame, and traction-cables which encircle said sheave, whereby the frame with its group of armatures may be held fixed or may be permitted to rotate without driving or but slightly driving the said shaft, in the manner explained.

JOHN C. HENRY.

Witnesses:
HARRY E. KNIGHT,
GEO. H. KNIGHT, Jr.